April 4, 1944.  K. E. GOULD  2,345,932
MEASURING APPARATUS
Filed March 26, 1941
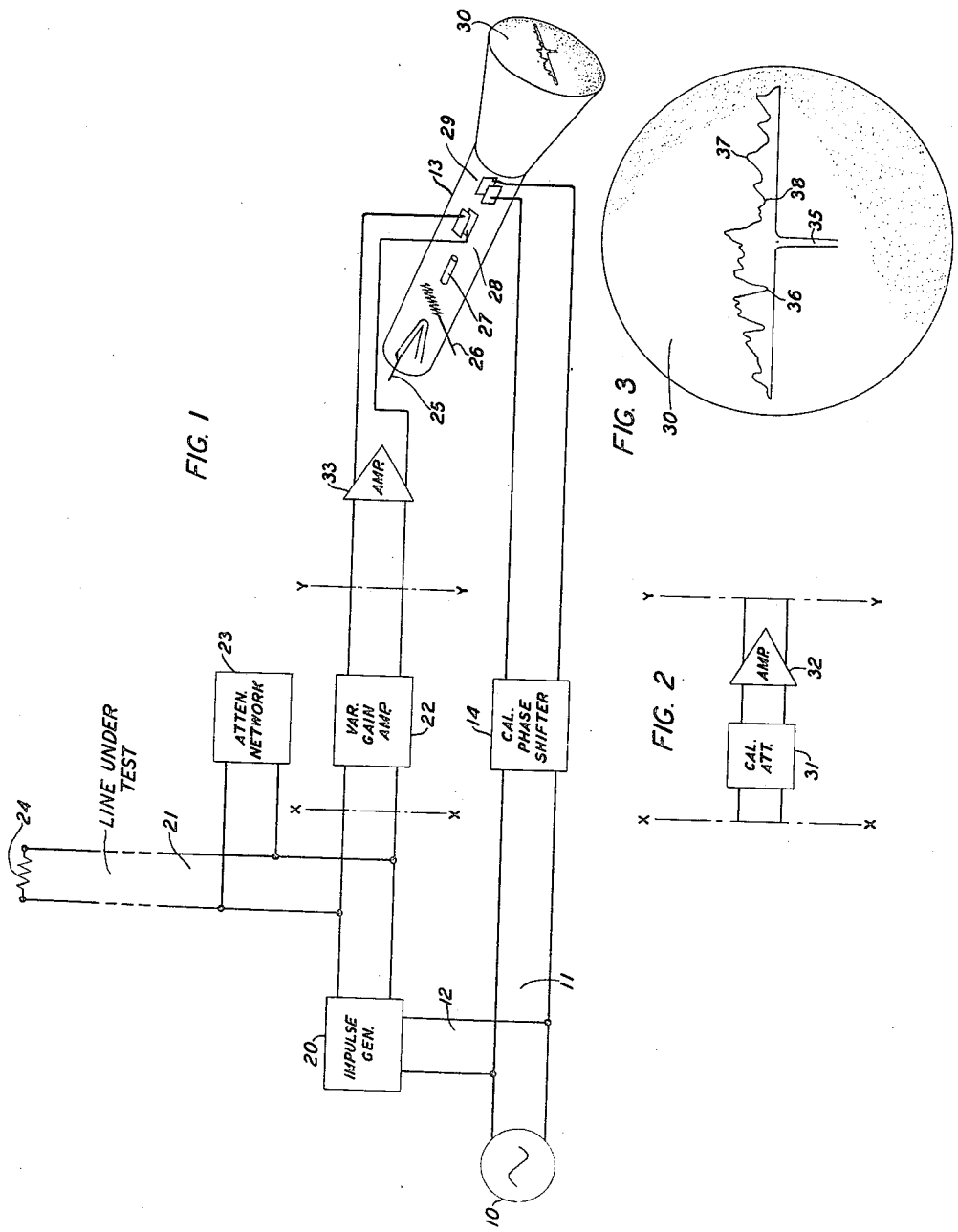
INVENTOR
K. E. GOULD
BY
*H. A. Burgess*
ATTORNEY Patented Apr. 4, 1944

2,345,932

UNITED STATES PATENT OFFICE 2,345,932

MEASURING APPARATUS

King E. Gould, Fanwood, N. J., assignor to Bell Telephone Laboratories, Incorporated, New York, N. Y., a corporation of New York Application March 26, 1941, Serial No. 385,241

12 Claims. (Cl. 175—183)

This invention relates to measuring apparatus and more particularly to a device for measuring and locating impedance irregularities of a transmission line.

In the manufacture of coaxial conductor pairs, multiconductor cables, shielded and balanced pairs, and paper insulated pairs contemplated for use in carrier current and television systems, information concerning impedance irregularities of the conductor pairs may indicate that imperfections are being inadvertently introduced into the manufacturing process, defective material is being used or one manufacturing process is preferable to another as regards uniformity of the resulting product. In the case of open-wire or cable pairs in the field, such information may indicate that certain pairs are unsuited for use in carrier current or television systems. In addition, such information facilitates the overall design of both latter systems as it shows the impedance requirements that will have to be met in apparatus contemplated for embodiment therein, and is important because television requirements necessitate a relatively high degree of such uniformity irrespective of whether transmission is on a carrier or video basis.

Accordingly, this invention contemplates apparatus for obtaining information regarding the impedance uniformity of conductor pairs which are either in the process of manufacture in the factory or located in the field.

The main object of the invention is to indicate simultaneously impedance irregularities extending throughout the length of transmission lines contemplated for use in carrier current or television systems.

Another object is to locate on a transmission line the points of impedance irregularity.

A further object is to obtain direct readings of the magnitude of individual impedance irregularities at successive points along the length of a transmission line.

In a specific embodiment, the invention comprises a source of fundamental sinusoidal waves applied through a two-branch circuit to a cathode ray oscilloscope embodying vertical and horizontal deflecting plates, an electron beam and a fluorescent screen. One path applied to the horizontal deflecting plates embodies an adjustable phase shifter. The other path applied to the vertical deflecting plates includes in sequence an impulse generator, a transmission line to be tested, and a variable gain amplifier.

One feature of the invention is that a trace of impedance irregularities on the fluorescent screen may be photographed and thereby preserved for future purposes. Another feature is that the distance out on the line to individual points of impedance irregularity may be expeditiously determined. A further feature involves a provision of substantially constant line attenuation over a range of frequencies thereby effecting both accurate and sensitive measurements. Still another feature is that the magnitude of impedance irregularities may be directly ascertained by utilization of a calibrated attenuator. A still further feature relates to both indicating and locating impedance irregularities of transmission lines in which such irregularities are subject to rapid and frequent changes, particularly with regard to open-wire lines swinging in the wind. An additional feature is that the nature of the impedance irregularity, that is, whether a resistive or reactive type, may be ascertained from the characteristics of the trace on the fluorescent screen.

The invention will be readily understood from the following description taken together with the accompanying drawing in which:

Fig. 1 illustrates a specific embodiment of the invention;

Fig. 2 shows alternate apparatus that may be used in Fig. 1; and

Fig. 3 is an oscillogram achieved in accordance with either Fig. 1 or Fig. 2.

Referring to Fig. 1, a source 10 supplies fundamental sinusoidal waves of suitable frequency to parallel circuits 11 and 12 both of which terminate in a cathode ray oscilloscope 13 of well-known structure, embodying at least a cathode 25, a control grid 26, an anode 27, a pair of vertical deflecting plates 28, 28, a pair of horizontal deflecting plates 29, 29 and an electron beam to produce a trace on a fluorescent screen 30. This oscilloscope may also include a suitable amplifier 33.

The circuit 11 applied to the horizontal deflecting plates 29, 29 embodies a calibrated phase shifter 14. The circuit 12 applied to the vertical deflecting plates 28, 28 includes in sequence a generator 20 to translate each cycle of fundamental sinusoidal waves into a single relatively sharp impulse wave of short-time interval, a transmission line 21 whose impedance irregularities are to be measured, and a variable gain amplifier 22. As the impulse waves embody a range of harmonic frequencies, both the amplifiers 22 and 33 are designed to possess substantially flat gain and constant delay characteristics over the range of impulse and harmonic frequencies. The impulse generator 20 may be of a suitable type such, for example, as that disclosed in the copending application, L. R. Wrathall, Serial No. 354,357, filed August 27, 1940.

The line 21 may comprise a coaxial conductor pair, a shielded and balanced pair, a pair of multiconductor cables or a paper insulated pair in the process of manufacture in the factory, and open-wire or conductor pairs installed in the field.

An attenuation network 23 is applied in shunt of the line 21 for a purpose that will be hereinafter explained. The line 21 may be terminated at its opposite end in a suitable network 24. A calibrated attenuator 31 and amplifier 32 may be substituted for the variable gain amplifier as illustrated in Fig. 2, it being understood that the circuit portion between the lines X—X and Y—Y of Fig. 2 may be substituted between the corresponding lines in Fig. 1. The gain and delay characteristics of the amplifier 32 are to correspond with those mentioned above in connection with the amplifiers 22 and 33.

In operation, the fundamental sinusoidal waves from source 10 are translated by the impulse generator 20 into impulse waves which are impressed on one terminal of the line 21 under test. These impulse waves are also directly applied through the variable gain amplifier 22 to the vertical deflecting plates 28, 28. Subsequently, the impulse waves reflected from the line 21 under test are also applied through the variable gain amplifier 22 to the vertical deflecting plates 28, 28. At the same time, fundamental sinusoidal waves are applied to the horizontal deflecting plates 29, 29. It is to be noted that the impulse generator 20 is synchronized with the sinusoidal sweep of the cathode ray oscilloscope, and therefore, the resulting trace of the electron beam on the fluorescent screen 30 comprising the successively reflected individual impulse waves persists as a substantially continuous standing wave extending along a horizontal axis, as illustrated in the oscillogram of Fig. 3.

The magnitude of successively reflected individual impulse waves depends on the change of impedance of the line at successive individual points therealong. Thus, a relatively large change of line impedance at a given point causes a relatively large magnitude of reflected impulse wave as indicated by the point 36 of Fig. 3, an intermediate change of line impedance at a given point causes an intermediate magnitude of reflected impulse wave as indicated by the point 37 of Fig. 3; and a relatively small amount of line impedance at a given point causes a relatively small magnitude of reflected impulse wave as indicated by the point 38 in Fig. 3. As the scale on the oscilloscope may be calibrated, it may be instantly apparent from the oscillogram thereof whether the line under test falls within tolerable limits of impedance variation. Thus, it has been found that the oscillogram of Fig. 3 is a satisfactory criterion of the impedance uniformity of the line under test. It is noted that the impulse waves applied directly to the vertical deflecting plates 28, 28 and indicated by the representation 35 in Fig. 3 will ordinarily be indicated with its peak off the screen 30, due to amplification in the variable gain amplifier 22. Also it is to be understood that the oscillogram of Fig. 3 may be photographed for purposes of study and record.

Therefore, from the characteristic shape of the reflected impulse waves illustrated in the oscillogram of Fig. 3, especially if the transmission characteristic of the line being tested is taken into account, information may be derived regarding the type of individual impedance irregularities, as it is known that the reflected wave from an impedance irregularity caused by a shunt reactive element is characteristically different from that due to a shunt resistive element.

As the attenuation of a uniform transmission line varies with frequency, the high frequency portions of the reflected impulse waves would tend to be received with too small an amplitude as compared with the low frequency portions of the reflected waves. Obviously, in such case it would be difficult if not impossible, to determine the impedance irregularities of the line with accuracy. To minimize such difficulty the complementary attenuation network 23 comprising, for example, a suitable combination of resistance, capacity and inductance elements is applied across the line under test. This parallel combination of the line under test and complementary network serves to provide substantially constant attenuation over a desired range of frequencies, including the impulse and harmonic waves. Consequently, the magnitude of the reflected impulse waves will be determined substantially entirely by impedance irregularities of the line. This tends to increase both the sensitivity and accuracy of the measurements. In the latter connection it is understood that the apparatus is calibrated to take into account the shunt effect of the complementary attenuation network and the correction therefor.

In the operation of Fig. 2, both the generated and reflected impulse waves are applied through the calibrated attenuator 31 and amplifier 32 to the vertical deflecting plates. This amplifier is designed such that with the attenuator at zero reading any overloading caused by the direct application of the impulse waves thereto changes the amplifier gain but slightly for the time interval subsequent to the impulse. In cases where a high degree of accuracy is not imperative, the magnitude of a given reflected impulse wave may be determined merely by varying the attenuator to cause the magnitude of the impulse wave directly applied to the oscilloscope to coincide substantially with the magnitude of the reflected impulse waves applied thereto. The reading of the attenuator, together with a correction to take into account the impedance into which the reflected impulse waves are transmitted from the line, will indicate directly the magnitude of the reflected impulse wave. It is to be understood that if desired, suitable corrections may be made for the impedance differences between the output of the impulse generator, the attenuator, the impedance of the line in parallel with the impedance network and the input impedance of the amplifier. The amplifier may be more accurately calibrated by superposing a 1-megacycle wave or other signal, preferably through a relatively high impedance, on the reflected impulse waves being measured. Calibration of the relation between the points of the trace on the oscilloscope, such as illustrated in Fig. 3 and individual impedance irregularities of the line under test may be obtained by introducing known amounts of impedance irregularity at certain points along the line.

The location of any point of impedance irregularity may be expeditiously ascertained by initially actuating the phase shifter such that the impulse wave applied directly to the oscilloscope is disposed at a given position along the horizontal axis, preferably at substantially the mid-point as illustrated by the representation 35 in the oscillogram of Fig. 3. It is also advantageous that the representation 35 be relatively narrow. Let it be assumed that it is desired to locate the point 36 on the line under test. As a first step a vertical mark is made on the external surface of the screen 30 to identify the initial position of a substantially mid-point of the representation 35. Next, the phase shifter is actuated to cause the point 36 to fall in the vertical external mark on the screen 30. In other words, the representation 35 and the point 36 are caused successively to have substantially the same phase angle. A similar procedure is followed to cause the representation 35 and the points 37 and 38 successively to have the same phase angle. In a manner that will be presently explained, the distance out on the line equivalent to the points 36, 37 and 38 may be readily ascertained.

Inasmuch as the impulse waves in the output of the generator are synchronized with the fundamental waves, and both waves have a fixed phase relation, the amount of change introduced in the phase angle of the fundamental waves is also the same as the amount of change introduced in the phase angle of the generated impulse waves to bring about the successive phase angle relation between the latter waves and the reflected impulse waves as mentioned hereinbefore. Consequently, the amount of change introduced in the phase angle of the fundamental wave is a measure of the time delay introduced in the displacement of the reflected impulse wave indicated by the point 36 of the oscillogram of Fig. 3.

As one impulse wave is generated for each cycle of the fundamental waves, and as the rate of propagation of waves having different frequencies is known, the distance out to any point on the line under test may be determined in terms of change in the phase angle of the reflected impulse waves. As the amount of change in the phase angle of the reflected wave represented by the point 36 is also known as previously pointed out, the distance out on the line under test corresponding to the point 36 in the oscillogram of Fig. 3 may be readily calculated. Similarly, the distances out on the line under test corresponding to the points 37 and 38 in the oscillogram of Fig. 3, as well as those of other points not identified, may be readily determined. For a more complete discussion of utilizing change in phase angle of an alternating current wave to determine distance on a transmission line, reference is made to the patent of H. Nyquist, No. 2,209,064, granted July 23, 1940.

It is to be understood the calculations include allowance for the fact that a given reflected wave represents a larger magnitude of impedance irregularity the farther such wave is out on the line from the terminal to which the impulse waves are applied.

The indication and location of impedance irregularities in open-wire lines is particularly useful in cases in which such irregularities may vary rapidly and frequently, as open-wire lines subject to the disturbances of the wind.

What is claimed is:

1. In combination, a transmission line whose impedance characteristic is to be ascertained, means to apply impulse waves of certain frequency to said line, means to indicate the magnitudes of the waves reflected from successive points of impedance unbalance along said line, and means comprising a source of alternating current waves which have a frequency synchronized with said certain frequency and which are applied to said indicating means to cause the magnitudes of the waves reflected from said line to constitute substantially a standing wave pattern that simultaneously represents the relative magnitudes of the impedance unbalance at the successive points along said line.

2. In combination, a transmission line whose impedance unbalance along its length is to be ascertained, means comprising a cathode ray tube embodying individual pairs of horizontal and vertical deflecting plates to indicate the magnitude of impulse waves reflected from said line, a source of fundamental sinusoidal waves, means connected between said fundamental source and said line to translate each cycle of a portion of said fundamental sinusoidal waves into a single impulse wave of short-time duration, circuit means to connect said line to said indicating means to apply the reflected impulse waves to said pair of vertical deflecting plates, a calibrated attenuator and amplifying means included in said circuit means, other circuit means to connect said fundamental source to said indicating means to apply another portion of the fundamental waves to said pair of horizontal deflecting plates, a phase shifter in said other circuit means, and an attenuation network applied in shunt of said line.

3. In combination, a transmission line whose impedance irregularities over its length are to be ascertained, indicating means comprising a cathode ray tube embodying individual pairs of horizontal and vertical deflecting plates, a source of fundamental sinusoidal waves, an impulse generator connected between said fundamental source and one terminal of said line, variable gain amplifying means to apply to said pair of vertical deflecting plates both impulse waves applied to said one terminal of said line and impulse waves reflected from said line, circuit means to connect said fundamental source to said pair of horizontal deflecting plates, a phase shifter in said circuit means, and an attenuation network applied in shunt of said one terminal of said line.

4. In combination, a source of fundamental frequency waves, indicating means comprising a cathode ray tube having two pairs of electrodes for deflecting the cathode ray beam in two different directions, two paths extending between said source and said indicating means, an impulse generator, a transducer whose impedance characteristic over its length is to be ascertained, amplifying means and a first pair of deflecting electrodes in sequence in one path, a phase shifter and a second pair of electrodes in sequence in the other path, and an attenuation network in shunt of said transducer.

5. In combination, a source of fundamental frequency waves, a cathode ray oscilloscope embodying a fluorescent screen, an electron beam and two sets of deflecting plates, a first circuit extending between said fundamental source and a first set of said deflecting plates, an impulse generator, a transducer whose impedance characteristic over its length is to be ascertained, and amplifying means in sequence in said first circuit, a second circuit extending between said fundamental source and a second set of said deflecting plates, a calibrated phase shifter in said second circuit, an attenuation network applied to said transducer, said electron beam effecting a trace on said fluorescent screen to represent the impulse waves reflected from said transducer.

6. Apparatus for indicating the magnitude of impedance changes extending throughout the length of a transmission line, comprising a cathode ray oscilloscope embodying a fluorescent screen, an electron beam and vertical and horizontal deflecting plates, a source of fundamental sinusoidal waves, means interposed between said source and one terminal of said line to translate each cycle of said fundamental waves into a single impulse wave of short-time duration, circuit means to connect said one terminal of said line to said vertical deflecting plates, a calibrated attenuator and amplifying means in series in said circuit means, other circuit means to connect said fundamental source to said horizontal deflecting plates to synchronize the horizontal sweep with the impulse waves applied to said one terminal of said line, a calibrated phase shifter in said other circuit means to adjust along a horizontal axis representations of both the impulse waves applied to said line and the impulse waves reflected therefrom, and an attenuation network connected in parallel with said one terminal of said line, the trace of said electron beam on said screen representing the magnitude of the impulse waves reflected from said line and thereby the magnitude of impedance changes of said line.

7. Apparatus for indicating the magnitude of impedance changes extending over the length of a transmission line and locating the individual impedance changes, comprising a cathode ray oscilloscope embodying a fluorescent screen, an electron beam and vertical and horizontal deflecting plates, a source of fundamental frequency waves, a first circuit connecting said fundamental source and said vertical deflecting plates, an impulse wave generator, said line and a variable gain amplifying means in sequence in said first circuit so that both the impulse waves applied to said line and the impulse waves reflected therefrom are impressed on said vertical deflecting plates, a second circuit connecting said fundamental source and said horizontal deflecting plates, a calibrated phase shifter in said second circuit to adjust along a horizontal axis representations of both the impulse waves applied to said line and the impulse waves reflected therefrom, and an attenuation network applied to said line, the trace of said electron beam on said screen representing the magnitude of the impulse waves reflected from said line and thereby the magnitude of impedance changes at successive points over the length of said line.

8. In a system for indicating impedance irregularities at successive points over a signaling line, a source of alternating current waves of fundamental frequency, means to translate each cycle of a portion of the fundamental waves into an impulse wave, means to apply the impulse waves to said line to produce wave reflections caused by successive points of impedance irregularity over said line, and means responsive to said reflections and another portion of the fundamental waves to produce indications of the impedance irregularities at successive points over said line.

9. In a system for indicating successive impedance irregularities along a signaling transmission line, means comprising an oscilloscope embodying an electron beam, a fluorescent screen, and electrodes for varying the position of said beam on said screen, a source of alternating current waves of fundamental frequency, means to translate individual cycles of a portion of said fundamental waves into individual impulse waves and apply said latter waves to said line for producing wave reflections from successive points at which the impedance irregularities exist, means for receiving both the impulse waves and wave reflections and impressing both latter waves on certain of said electrodes to vary the position of said beam on said screen in one direction, means to apply another portion of the fundamental waves to others of said electrodes to vary the position of said beam on said screen in a different direction in properly timed relation to the wave reflections such that both the impulse wave and wave reflections persist as a standing wavy trace extending across said screen.

10. In a system for indicating impedance irregularities at successive points on a signaling line, a source of current waves of fundamental frequency, means to translate each cycle of a portion of the fundamental waves into an impulse wave, means to apply the impulse waves to said line to produce wave reflections caused by successive points of impedance irregularity on said line, oscilloscope means embodying vertical and horizontal deflecting plates, an electron beam and a fluorescent screen, and circuit means to apply the impulse waves and wave reflections to said vertical deflecting plates and another portion of the fundamental waves to said horizontal deflecting plates in such timed relation that said electron beam produces on said screen a wavy trace which persists as a standing wave along a horizontal axis.

11. In a system for indicating impedance irregularities at successive points on a signaling line and for determining the distance out on the line to desired points, a source of alternating current waves of fundamental frequency, means to translate each cycle of a portion of the fundamental waves into an impulse wave, circuit means to apply the impulse waves to said line to produce wave reflections caused by successive points of impedance irregularity on said line, an oscillograph tube comprising an electron beam, a fluorescent screen, and vertical and horizontal deflecting plates, circuit means to apply said impulse waves and said wave reflections to said vertical deflecting plates, other circuit means to apply another portion of the fundamental waves to said horizontal deflecting plates in such timed relation with respect to said impulse waves and wave reflections that the electron beam produces a standing trace along a horizontal axis of said screen together with a trace of said impulse wave, and a phase shifter in said other circuit means to adjust on said screen along a horizontal axis the positions of the trace of the impulse wave and of a desired point of said wave reflections such that said impulse wave and said desired point are caused successively to have the same phase angle.

12. A system to test a signaling transmission line for impedance unbalance over its length, comprising a source of alternating current waves of certain frequency, means to apply impulse waves to said line at a frequency which is synchronized with the certain frequency of said source, and means responsive to the waves reflected from said line and the certain waves of said source to indicate simultaneously the relative magnitudes of the waves reflected from successive points along the length of said line such that the relative magnitudes of the reflected waves constitute a standing wave pattern that represents simultaneously the relative magnitudes of the impedance unbalance at the successive points along the length of said line.

KING E. GOULD.